United States Patent [19]

Hoch et al.

[11] 3,715,389

[45] Feb. 6, 1973

[54] PROCESS FOR PREPARING GLYCOL ESTERS FROM OLEFINICALLY UNSATURATED COMPOUNDS

[75] Inventors: Robert Hoch, Brooklyn, N.Y.; John Kollar, Wyckoff, N.J.

[73] Assignee: Halcon International, Inc.

[22] Filed: March 1, 1971

[21] Appl. No.: 120,018

[52] U.S. Cl. ..........260/497 R, 260/469, 260/471 R, 260/473 S, 260/476 R, 260/481 R, 260/483, 260/484 R, 260/615 B, 260/633

[51] Int. Cl. .............................................C07c 69/16

[58] Field of Search ..................................260/497 R

[56] References Cited

UNITED STATES PATENTS

| | | | |
|---|---|---|---|
| 3,427,348 | 2/1969 | Olson | 260/497 R |
| 3,479,395 | 11/1969 | Huguet | 260/497 R |
| 3,542,857 | 11/1970 | Lutz | 260/497 R |

FOREIGN PATENTS OR APPLICATIONS

| | | | |
|---|---|---|---|
| 904,304 | 8/1962 | Great Britain | 260/533 N |

*Primary Examiner*—Lorraine A. Weinberger
*Assistant Examiner*—Richard D. Kelly
*Attorney*—William C. Long, David Dick and Riggs T. Stewart

[57] ABSTRACT

Esters of vicinal glycols are prepared by reacting olefinically unsaturated compounds with molecular oxygen and monobasic carboxylic acids in the presence of a liquid phase reaction medium within an oxidation zone. The reaction is conducted in the presence of a variable valence metal cation and bromine, chlorine, a bromine-containing compound or a chlorine-containing compound. In this process a vapor stream comprising unreacted oxygen and unreacted olefinically unsaturated compound is withdrawn from the oxidation zone and recycled at least in part to the oxidation zone. Rate of formation of the desired glycol esters can be increased by maintaining specified amounts of a third component or mixture of components in the vapor recycled to the reaction system while concurrently maintaining oxygen partial pressure within a specified range.

20 Claims, 1 Drawing Figure

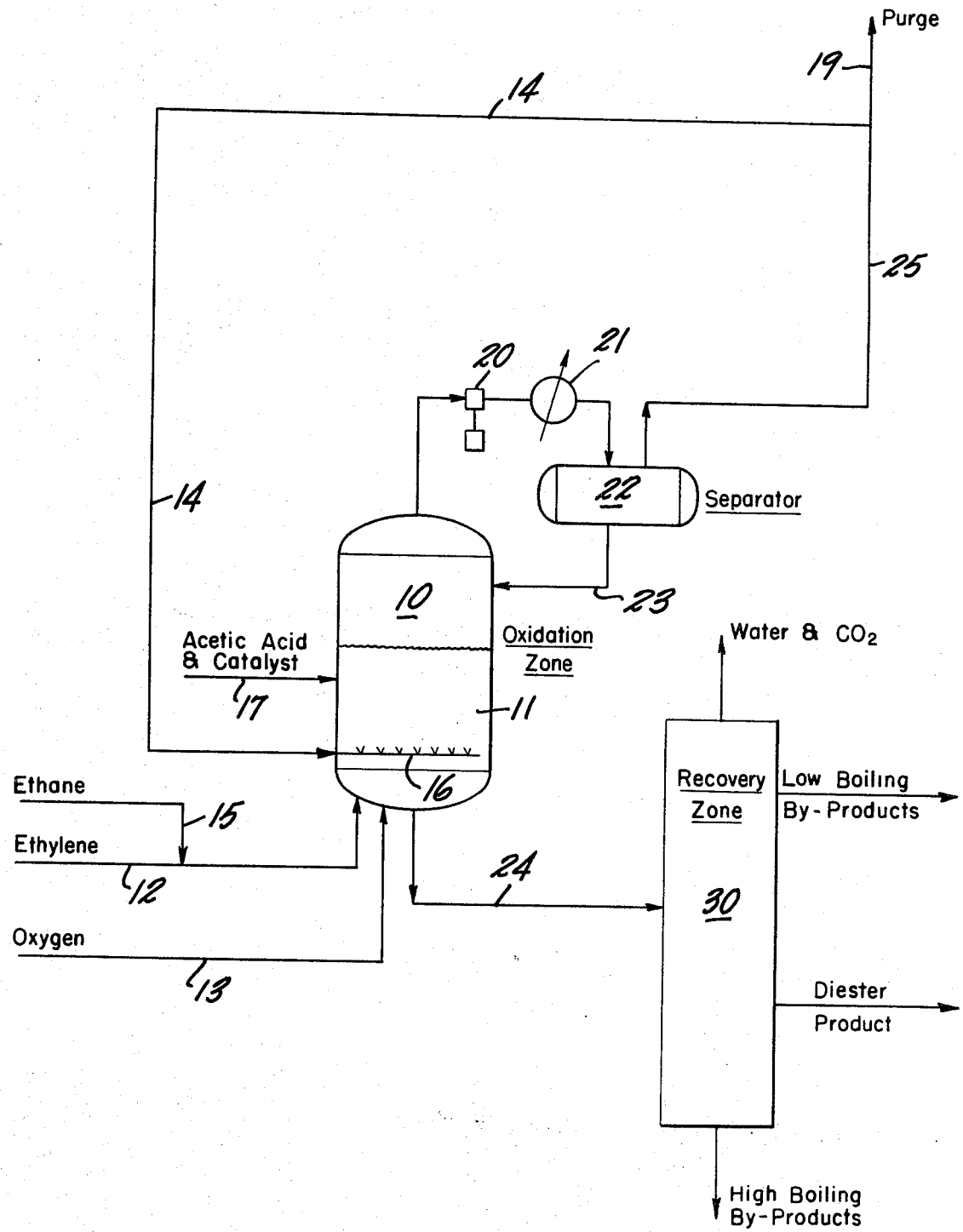

PROCESS FOR PREPARING GLYCOL ESTERS FROM OLEFINICALLY UNSATURATED COMPOUNDS

BACKGROUND OF THE INVENTION

This invention relates to a process for preparing esters of vicinal glycols by the reaction of olefinically unsaturated compounds and molecular oxygen with monobasic carboxylic acids.

Belgian Pat. Nos. 738,104 and 738,463 describe catalytic systems for the direct production of such esters from olefinically unsaturated compounds. More specifically, these patents describe the reaction of the olefinically unsaturated compound and molecular oxygen in the presence of variable valence metal cations and appropriate halogens or halogen-containing compounds.

These patents represent basic developments of great commercial interest which can be made even more commercially attractive by increasing the rate of formation of the desired ester products. This type of improvement enables reduction of equipment sizes for a given production capacity without sacrifice in yield.

It has long been thought that rate of desired product formation could be increased most effectively by increasing the partial pressure of the olefin within the reaction system. This belief is expressed in Huguet, U. S. Pat. No. 3,479,395. Moreover in other liquid phase olefin oxidation processes, it is known that increasing the partial pressure of the olefin reactant increases the reaction rate. This is shown for the oxidation of olefins to carbonyl compounds, for example, in British Pat. No. 1,032,325 published on June 8, 1966 and is suggested by Clark et al. in British Pat. No. 1,026,597.

SUMMARY OF THE INVENTION

The reaction system of this invention is directed to the production of monobasic carboxylic diesters of $C_2$–$C_5$ vicinal glycols (and precursors thereof) by the oxidation with molecular oxygen of $C_2$–$C_5$ olefinically unsaturated compounds in the presence of a monobasic carboxylic acid. The glycol moiety of the ester products of the process of this invention has a carbon structure corresponding to that of the olefinically unsaturated compound while the acyl moiety of the ester products corresponds to that of the monobasic carboxylic acid. The following chemical equation illustrates the primary chemical reaction involved in the process of this invention but it is not intended to limit this invention to the embodiment illustrated.

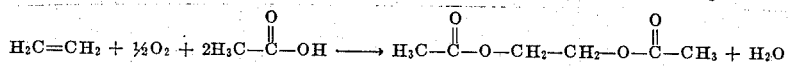

The illustrated reaction occurs in the liquid phase within an oxidation zone containing a liquid phase reaction medium. In practice, the olefinically unsaturated compound and molecular oxygen are continuously introduced to the oxidation zone, and a vapor stream comprising unreacted olefinically unsaturated compound and unreacted oxygen is continuously withdrawn from the oxidation zone and recycled at least in part to the oxidation zone.

Surprisingly, it has now been found that, over a very broad range, olefin partial pressure has but little effect upon the rate of this olefin oxidation process while oxygen partial pressure has a very pronounced effect upon reaction rate. Such an observation is plainly indicative of fundamental process differences between the process involved in this invention and those known to the prior art.

Normally, however, oxygen partial pressure (or concentration) is restricted by safety considerations, and it has not heretofore been thought possible in ethylene oxidation systems to exceed about 10 mole percent oxygen in vapors at any point in the system or about 12 percent oxygen with higher olefins such as propylene. However, by the techniques of this invention it has been found permissible to operate with wider variations in oxygen partial pressure (or concentration) than heretofore deemed practicable. Thus this invention provides greater flexibility in operation without sacrifice in safety and, in many embodiments of this invention, substantial increases in reaction rate can readily be obtained.

The technique of this invention requires the maintenance of at least 55 mole percent of a third component in the portion of the vapor stream withdrawn from the oxidation zone which is recycled to the oxidation zone, the third component being at least one member of the group consisting of methane, ethane, propane, and carbon dioxide. In the context used herein, the phrase "third component" means a component or mixture of components other than molecular oxygen or olefinically unsaturated compound and thus the third component may readily include materials indigenous to the reaction system. Also for brevity, the portion of the vapor stream withdrawn from the oxidation zone which is recycled to the oxidation zone will frequently be referred to in this specification as the "recycled vapor stream" or the "recycled vapor."

In conjunction with the employment of the third component, it has also been found essential to maintain the oxygen partial pressure in the recycled vapor stream at a level of at least 5 p.s.i., but the oxygen partial pressure of this vapor stream should not be greater than R where R is given by:

$$R = P \frac{(0.18y_1 + 0.09y_2 + 0.135y_3 + 0.117y_4 + 0.36y_5)}{(y_1 + y_2 + y_3 + y_4 + y_5)}$$

where R is the oxygen partial pressure in psia
P is the total pressure of the recycled vapor stream
$y_1$ is the mole fraction of ethane in the recycled vapor stream
$y_2$ is the mole fraction of nitrogen in the recycled vapor stream
$y_3$ is the mole fraction of carbon dioxide in the recycled vapor stream
$y_4$ is the mole fraction of methane in the recycled vapor stream
$y_5$ is the mole fraction of propane in the recycled vapor stream It is noteworthy that the permissible maximum oxygen partial pressure depends not only upon the nature and amount of third component or components but also involves consideration of the total pressure and the amount of nitrogen in this vapor. The amount of nitrogen is not critical except insofar as it affects the value of R but the total of third component or components (i.e., the sum of $y_1 + y_3 + y_4 + y_5$) must be at least 0.55 (i.e., 55%) or greater but any one or more of these $y$ values can be 0. It is also clear that the total of $y_1$ to $y_5$ inclusive will be less than 1.00 since other components including unreacted oxygen, water vapor, argon and unreacted olefinically unsaturated compound will be present in this vapor. In other words, any one of $y_1$, $y_3$, $y_4$ or $y_5$ can have any value from zero to one minus the oxygen content of the recycled vapor but usually will be from 0 to 0.8, desirably 0 to 0.7 and preferably from 0 to 0.65. Of course the sum of $y_1 + y_3 + y_4 + y_5$ must be at least 0.55. The value of $y_2$ in practice can be from 0 to 0.3 and preferably less than 0.25. Thus it is apparent that the permissible oxygen partial pressure (or concentration) can be varied with great flexibility and safety over a broader range than heretofore thought possible.

The concentration of the olefinically unsaturated compound in the vapor stream while not critical is desirably at least 1.0 mole percent to avoid losses in selectivity by complete combustion thereof to form primarily carbon dioxide and water.

DETAILED DESCRIPTION OF THE INVENTION

To place this invention in its proper context it is necessary to indicate the manner in which the hereinabove described reaction is carried out with particular emphasis on its conduct on a large scale. Within the oxidation zone a liquid phase reaction medium comprising the carboxylic acid reactant is maintained. The olefinically unsaturated compound and molecular oxygen are introduced to the oxidation zone and are intimately contacted with the liquid phase reaction medium therewithin to form the desired diester product. A portion of the liquid phase reaction medium containing the reaction products and a portion of the unconsumed reactants is withdrawn from the reactor as a liquid. Also withdrawn from the reactor is a vapor stream containing at least some of the unreacted olefinically unsaturated compound and unreacted oxygen. This stream can be processed to remove less volatile components therefrom and a portion of this vapor stream is purged to avoid build-up of undesired impurities. The balance of this vapor stream (after optional processing and purging) is recycled to the oxidation zone. The recycle of this vapor minimizes loss of valuable reactants and facilitates control of the reaction system and it is the composition of this recycled vapor which must in accordance with the process of this invention, be controlled.

This invention in particular requires modification of the composition of this recycled vapor stream by providing at least 55 mole percent of a third component selected from at least one member of the group consisting of methane, ethane, propane and carbon dioxide in the recycled vapor stream. Of these materials, the paraffins (i.e., methane, ethane and propane) are especially useful and desirable while ethane is particularly preferred. Other materials will, of course, be present in this vapor stream including some by-product carbon dioxide. Nitrogen, argon and water vapor are usually present. The presence of such materials as carbon dioxide in this vapor stream in conjunction with other third components can often be beneficial to the process of this invention and the use of mixtures as third components (such as mixtures of methane and carbon dioxide, ethane and carbon dioxide, and propane and carbon dioxide) is also especially preferred.

In conjunction with the maintenance of at least 55 mole percent of the third component in the recycled vapor stream, at least one other characteristic of this vapor stream must also be controlled; the partial pressure of oxygen therein must be at least 5 p.s.i.a. Desirably, the concentration of the olefinically unsaturated compound in this vapor stream is also controlled so that it is at least 1.0 mole percent. Of course, olefin concentrations in the recycled vapor can be substantially over 1 percent, amounts up to about 30–40 percent (mole) being employable with amounts of olefin in the recycled vapor between 1 mole percent and 30 mole percent being preferred.

As indicated above, the third component, the presence of which is required in the recycled vapor stream, can be a material extraneous to the reaction system employed, in which case introduction thereof to the system either as a separate stream or in admixture with one or more of the reactants or by various combinations of these techniques is required. Also, often a portion of the desired third components will be supplied as impurities normally present in one or more of the reactants (for example, ethane as an impurity in an ethylene feed) and it can therefore sometimes be an advantage of this invention that comparatively low purity feeds can be employed. Suitable third components also include materials which are indigenous to the reaction system including particularly carbon dioxide. Where the third component is indigenous to the system, materials from an extraneous source need not be employed; they may merely be permitted to build-up in the recycled vapor stream to the requisite concentration. Independent of the source of the third component, control of the composition of the recycled vapor stream and/or control of the partial pressures of the components thereof can be readily accomplished by a variety of known techniques. Some of these techniques include the manner, if any, in which the vapor stream withdrawn from the oxidation zone is processed prior to recycle of a portion thereof. Adjustment of feed rates of reactants to the oxidation zone as well as adjustment of their temperature, pressure and the phase (vapor or liquid) in which they are introduced to the oxidation zone can also be used. Variations in oxidation zone pressures and temperatures and deliberate addition of third component to the system can also be used. In practice, of course, combinations of these techniques, among others, would normally be employed.

It is apparent that the quantity of impurities in the vapor stream purged from the system must roughly correspond to the quantity of impurities present in the net feeds to the oxidation zone (i.e., in the feeds excluding recycles). Hence the amount of purge required is radically reduced by the use of commercial high-purity oxygen feedstocks and the control of vapor stream composition is facilitated thereby. Hence this invention requires use of high-purity oxygen feedstocks meaning oxygen feedstocks containing at least 85 mole percent of oxygen, desirably containing at least 90 mole percent and preferably containing at least 95 mole percent oxygen. It is also desirable to use oxygen which contains comparatively low proportions of argon relative to other impurities present. Adjustment of argon proportion is readily accomplished by, for example, introducing small amounts of nitrogen or air to the oxygen. Equivalent results are obtained by introducing such materials at other points in the reaction system.

While the recycled vapor stream must contain at least 55 mole percent of the third component or components, improved reaction rates are obtained when this vapor stream contains at least 60 mole percent of third component or mixture of components and this is preferred. On the other hand, amounts of third component in excess of 90 percent give no appreciable advantage, though they can be used, and it is desirable that the vapor stream contain not more than 85 percent and preferably not more than 80 percent of third component.

Similarly, it has also been indicated that the partial pressure of oxygen in this vapor stream must be at least 5 p.s.i.a. Desirably this vapor stream has an oxygen partial pressure of at least 10 p.s.i.a. and preferably of at least 15 p.s.i.a. Increasing oxygen partial pressure, as heretofore indicated, has a pronounced favorable effect on reaction rate. Preferred operations are those wherein oxygen partial pressure is within the range of 10–110 p.s.i.a. and especially within the range of 15–75 p.s.i.a. However oxygen partial pressure should never exceed a value of R where R is given by the following equation:

$$R = P \frac{(0.18 y_1 + 0.09 y_2 + 0.135 y_3 + 0.117 y_4 + 0.36 y_5)}{(y_1 + y_2 + y_3 + y_4 + y_5)}$$

where $R$ is oxygen partial pressure in p.s.i.a.

$P$ is the total pressure of the recycled vapor stream $y_1$ is the mole fraction of ethane in the recycled vapor stream $y_2$ is the mole fraction of nitrogen in the recycled vapor stream $y_3$ is the mole fraction of carbon dioxide in the recycled vapor stream $y_4$ is the mole fraction of methane in the recycled vapor stream $y_5$ is the mole fraction of propane in the recycled vapor stream To allow for fluctuations in operating conditions while securing the advantages of high oxygen partial pressure, it is desired that oxygen partial pressure in the recycled vapor stream not be in excess of $0.95R$ and preferably not in excess of $0.90R$.

The desired product of the process of this invention is a vicinal glycol diester. The glycol moiety of this diester corresponds in structure to the olefinically unsaturated compound employed as the reactant. The acyl moiety of the ester corresponds to the monobasic carboxylic acid reactant. However, in the reaction, substantial amounts of valuable materials other than the diester can often be formed, valuable because they are precursors of the desired diester product. Such precursors include glycol monoester, the glycol corresponding to the olefin itself, halohydrins, vicinal halo carboxylates, vicinal dihalides and higher boiling ether-alcohols and ether-alcohol mono- and di-esters and their corresponding halogenated derivatives. For example, when the olefinically unsaturated compound is ethylene, the monobasic carboxylic acid is acetic acid and bromine or a bromine-containing compound is employed, these materials include bromohydrin, 2-bromoethyl acetate, 1,2-dibromoethane, diethylene glycol, triethylene glycol and their mono- and di-acetate derivatives and the brominated derivatives of these glycol-ethers as well as smaller amounts of polyethylene glycols and their mono- and di-acetate and brominated derivatives. These precursors, together with the monobasic carboxylic acid reactant, the diester product itself, water and the catalyst system (to be hereinafter described) are the predominant components of the liquid phase reaction medium. Of course, olefinically unsaturated compound and molecular oxygen are also present therein.

The olefinically unsaturated compounds useful in the process of the invention are the $C_2$–$C_5$ monoalkenes and cyclomonoalkenes which can also contain functional substituents. The double bond in the monoalkene may be positioned at any one of the carbon atoms such as alpha, beta, gamma and delta positions and the like. Straight or branch chain alkenes can be used.

Suitable alkenes include ethylene, propylene, butene-1, butene-2,3-methyl-butene-1, n-pentene-1, n-pentene-2 and the like. Cycloalkenes such as cyclopentene and cyclobutene can also be used.

All of the above alkenes and cycloalkenes may contain one or more functional substituents which are inert to the reaction such as nitro, cyano, halo (i.e., fluoro, chloro, bromo and iodo), lower alkoxy (methoxy, ethoxy, propoxy), lower alkylthio (methylthio to propylthio), hydroxy, lower alkanoyloxy of one to three carbons (e.g., acetyloxy) and the like.

The preferred olefinically unsaturated compound reactants are ethylene, propylene, butene-2, allyl alcohol, allyl acetate, allyl chloride, 2-chlorobutene-2 and 3-methylbutene-1. Ethylene and propylene are especially preferred.

The olefinically unsaturated compound contemplated by this invention may contain the variety of impurities normally associated with commercially available olefins.

The carboxylic acid employed in the oxidation supplies the acyl moiety to the glycol ester and is preferably a lower aliphatic monobasic acid of from one to six carbon atoms such as formic, acetic, propionic, butyric, isobutyric, the valeric and caproic acids as well as their substituted derivatives. Acids containing substituents inert under the oxidation conditions can be used, such substituents being the same as those described above for the olefinically unsaturated compound reactant.

Monobasic aromatic acids can also be used, especially those containing one to three fused hydrocarbyl rings. Among such acids are, for example, benzoic, 1-naphthoic, o-toluic, m-toluic, o-chlorobenzoic, m-chlorobenzoic, p-chlorobenzoic, o-nitrobenzoic, m-nitrobenzoic, p-hydroxybenzoic acids.

In the more preferred aspects of this invention, the carboxylic acid is an aliphatic acid or aromatic acid, but especially the monophenyl aromatic acids (e.g., benzoic or toluic acids) and the lower saturated monoaliphatic acids ($C_1$–$C_2$). Acetic acid is especially preferred.

The invention also contemplates the use of mixed carboxylic acid reactants in any desired ratio, although it is preferred to employ a single acid reactant when one wishes to avoid obtaining mixed ester products. The carboxylic acid can be employed in any commercially available form including the use of aqueous solutions thereof. It is preferred, however, to employ commercial acids having no more than 25 percent water, and especially less than 15 percent water, such as 90–98 percent acetic acid. The acids used can suitably contain the various organic and inorganic impurities normally associated with the various commercially available materials and, for purpose of this invention, such impurities can be allowed to remain or can be removed as one desires. Unreacted acid, containing impurities indigenous to the process can be recovered and recycled.

Correspondingly, the preferred glycol esters to the production of which the process of this invention is applicable include ethylene glycol diacetate, 1,2-propylene glycol diacetate, the corresponding diformates and dibenzoates as well as the corresponding mono-esters.

The process of this invention requires a catalyst system which is a variable valent metal cation plus at least one of bromine, chlorine, a bromine-containing compound or a chlorine-containing compound. The variable valent metal cation can be utilized in its elemental form and added to the oxidation zone as a fine powder or can be added in any form which, in solution or suspension under oxidation conditions, will yield at least some soluble metal ions. For example, the metal source can be the carbonate, oxide, hydroxide, bromide, chloride, lower ($C_1$–$C_3$) alkoxide (e.g., the methoxide), phenoxide or metal carboxylates wherein the carboxylate ion is the same or different from the acid reactant. In a preferred aspect, the metal is added as the oxide, hydroxide, salt of the acid reactant or as the halide. Furthermore, the metal compound employed can contain impurities naturally associated with the commercially available compounds, and need not be purified any further.

The preferred systems employ tellurium, cerium, antimony, manganese, vanadium, gallium, arsenic, cobalt, copper, selenium or silver as the variable valence metal cations when using bromine or a bromine-containing compound, with tellurium, cerium, antimony, manganese or vanadium being the more desirable and tellurium, cerium, antimony, and manganese being most preferred. For use with chlorine or a chlorine-containing compound, the preferred catalyst contains cerium, manganese, arsenic, cobalt, copper, selenium or chromium; the more preferred being cerium, manganese, cobalt, copper and selenium with the most preferred being cerium, manganese and cobalt.

When it is desired to use a bromine or chlorine-containing compound in the reaction instead of bromine or chlorine itself, one can employ any compound capable upon oxidation or by other means, of producing bromide or chloride ions in solution. For example, one can use hydrohalic acids (gaseous or aqueous, preferably concentrated aqueous acid) any metal halide such as the alkali, alkali earth or heavy metal bromides or chlorides, (potassium bromide, calcium chloride, manganese bromide and the like) the metal bromides or chlorides corresponding to the variable valence metal cations or organo-chlorine and organo-bromine compounds such as alkyl di-halides, lower aliphatic ($C_1$–$C_6$) halides (propylhalide, pentylhalide), cyclo lower aliphatic halides (cyclohexylhalide) or lower aliphatic dihalides, (ethylene dichloride, dibromoethylene) and all of the halogen-containing diester precursors, all of which are considered for nomenclature purposes to be compounds capable of producing bromide or chloride anions. Also contemplated is the use of a mixture of two or more halogen-producing compounds, containing the same or different halogen, as well as mixtures wherein the cation of the halide compound may be the same or different from the cation of the other metal compound employed. The halogen employed may suitably contain impurities therein, normally associated with the commercially available halogen and in the preferred aspect of this invention the commercially available materials are employed.

Of all the catalyst systems, that most preferably employed is a tellurium metal cation (supplied to the oxidation zone as the powdered metal, the oxide, the carbonate, the bromide or in any one or more of the forms referred to above but most preferably as the oxide) in conjunction with a non-basic bromine source. The use of this especially preferred catalyst system enables the pH of the liquid phase reaction system to be maintained at a level less than 2.0 which further enhances yield and selectivity. As here used and throughout this specification, references to pH means the pH of a sample of the liquid phase reaction medium measured at 25°C. after dilution with 10 parts of water (weight basis) per part by weight of reaction medium. The pH is controlled by supplying sufficient bromine from a non-basic bromine source. Suitable non-basic bromine sources include any of those referred to above except the alkali and alkaline earth metal bromides. For example, the non-basic bromine source can be $Br_2$, hydrobromic acid, a tellurium bromide, an organic bromide, or a metal bromide where the metal cation is not an alkali or alkaline earth metal. Suitable organic bromides include all the bromine derivatives of the olefinically unsaturated compound being oxidized and the reaction products. For example, in the oxidation of ethylene these include but are not limited to 1,2-dibromoethane, ethylene bromohydrin, 2-bromo-ethyl carboxylate and other bromine-containing derivatives of ethylene and including higher molecular weight ethers and the like. Similarly, in the oxidation of propylene, the organic bromides include 1,2-dibromopropane, propylene bromohydrin, 2-bromo-propyl carboxylate and other bromine-containing derivatives of propylene and including higher molecular weight ethers and the like.

The various reactants employed in the oxidation reaction can be effectively used over a wide range of concentrations. The effective minimum concentrations of catalyst will depend upon temperature, residence time and the type of halogen, expressed in weight percent of halogen to total liquid phase within the oxidation zone and can be from 0.01 to 30 percent or higher, but desirably from 0.1 to about 20 percent and preferably from about 0.5 to about 10 percent. The concentration of total metal cation present, expressed in terms of equivalents of cation/equivalent of halogen, can suitably vary from about 1:0.01 to about 1:100 but preferably from about 1:0.2 to about 1:40 and especially from about 1:1 to about 1:20.

The temperatures maintained in the oxidation zone may vary from about 50°C. to the bubble point of the liquid phase reaction mixture within the zone. However, the temperatures are preferably maintained between about 90°C. to about 200°C. The total pressure in the oxidation zone should be maintained at from about atmospheric to about 2,000 p.s.i.a. and preferably from about 15 p.s.i.a. to about 1,000 p.s.i.a. Preferably, however, for the oxidation of lower olefins such as ethylene and propylene the total pressure of the oxidation zone should be maintained at from about 15 p.s.i.a. to about 1,000 p.s.i.a. and most preferably from about 50 to about 700 p.s.i.a. For the $C_4$–$C_5$ olefinically unsaturated compounds, the pressure preferably should be from about 50 to above 500 p.s.i.a. With ethylene and propylene, operating pressures between about 200 and about 600 p.s.i.a. are especially preferred.

The time of reaction depends to a great extent upon the concentration of reactants and therefore, can suitably vary over a wide range. Flow rates are preferably adjusted so that the rate of formation of product as glycol diester is from about 0.10 to 10.1 gram-moles per liter per hour. Once steady state conditions are obtained, the reaction can be continued with anywhere from about 5 to about 60 percent by weight of glycol esters and precursors therefor in the reaction product and preferably from about 15 to about 50 percent by weight based on the total weight of the reaction product would consist of glycol diesters and precursors therefor.

If desired, the reaction can be carried out in the presence of an inert solvent. Examples of such inert solvents are benzene, t-butylbenzene, t-butanol, etc. The carboxylic acid reactant, however, is an entirely suitable "solvent" and no extraneous material need be introduced for this purpose.

The reaction can conveniently be carried out in one reaction vessel, although if desired, the reaction may be carried out in two or more vessels connected in series. The reaction is preferably carried out continuously and intermediate products such as, for example, ethylene, bromohydrin, ethylene bromide and/or ethylene monobromo carboxylate or ethylene glycol derivatives as well as the glycol-ethers, carboxylated glycol-ethers and their halogenated derivatives can all suitably be recycled into the system to yield additional ethylene glycol ester. Similarly, in the oxidation of propylene, the propylene dibromide and/or propylene monobromo carboxylate and other propylene glycol precursors or derivatives can suitably be recycled into the oxidation zone to yield additional propylene glycol diester.

The esters prepared by the process of this invention find ready use as solvents and plasticizers. For example, ethylene glycol diacetate may be used as a solvent, or as an intermediate to prepare ethylene glycol or vinyl acetate. Similarly, ethylene glycol di-benzoate may be used as a solvent or an intermediate to prepare ethylene glycol or vinyl benzoate. If one desires, any of the glycol diesters can be used to prepare the corresponding glycol by hydrolysis methods well known in the art.

DESCRIPTION OF THE DRAWING

The annexed drawing is presented to further illustrate and explain the invention. For ease of explanation but without intent thereby to limit this invention, the reactants are assumed to be ethylene, acetic acid and oxygen while the third component is assumed to be ethane in admixture with carbon dioxide, the ethane being supplied from an extraneous source rather than as an impurity in the ethylene feed. The carbon dioxide is of course indigenous to the process.

To oxidation zone 10, within which is maintained a liquid phase reaction medium 11, are fed ethylene via conduit 12, oxygen via conduit 13 and the recycled vapor stream via conduit 14. A small amount of ethane is introduced via conduit 15 to the ethylene feed as it flows through conduit 12. While only the recycled vapor is shown as introduced through a sparger 16, the other materials would normally be introduced in similar fashion. Sparging of the gas through the liquid phase reaction medium in this fashion promotes agitation and assists in providing intimate contact of the ethylene and oxygen reactants with the liquid phase reaction medium comprising acetic acid. Mechanical agitating equipment (not shown) can also be provided if insufficient agitation is obtained by use of gas sparging alone.

Also introduced to oxidation zone 10 is acetic acid (via conduit 17) and the catalyst system (e.g., tellurium oxide and HBr) which can advantageously be suspended or dissolved in the acetic acid. Although the other feeds are continuously fed to the oxidation zone, acetic acid and/or catalyst can as readily be introduced intermittently as continuously.

The drawing indicates separate introduction of ethylene/ethane, oxygen and recycled vapor. Normally, however, one or more of these components would be pre-mixed prior to entering the oxidation zone. Thus the ethane/ethylene feed could be pre-mixed with the recycled vapor prior to entering oxidation zone 10, and the oxygen could be separately introduced. The alternative procedure set forth in the preceding sentence permits one to operate in a manner such that the total oxidation zone feeds (i.e., those introduced via conduits 12, 13 and 14) could be so rich in oxygen as to be within the flammable region were they fully pre-mixed; but, the rate of the reaction can be sufficiently high to permit safe operation with this procedure at all points within the system, i.e., the oxygen reacts so quickly that the operation remains a safe one.

Vapor comprising unreacted ethylene and oxygen together with carbon dioxide, ethane and more volatile components of the liquid phase reaction medium is withdrawn from oxidation zone 10 via conduit 18, compressed in compressor 20 and partially condensed in cooler 21. Condensed liquid and uncondensed vapor are separated from each other in separator 22. As shown, the condensed liquid is returned to oxidation zone 10 via conduit 23 and assists in dissipating the exothermic heat of reaction. Additional heat of reaction can, if desired, be removed by other means including cooling coils (not shown). The uncondensed vapor is withdrawn from separator 22 via conduit 25, and a small quantity of this vapor is purged via conduit 19. The balance of the vapor is the recycled vapor stream returned to oxidation zone 10 via conduit 14, and it is the composition of this vapor stream which is critical to the process of this invention.

A portion of the liquid phase reaction medium is withdrawn from the oxidation zone via conduit 24 whence it is fed to recovery zone 30. Within recovery zone 30 are separated the desired diester product (ethylene glycol diacetate), low boiling by-products and high boiling by-products which include components of the catalyst system. Within recovery zone 30 by-product water and carbon dioxide are also removed as separate components or conjointly. The carbon dioxide by-product can, if desired, be returned to the oxidation system to facilitate control of the recycled vapor composition. This would normally require additional facilities (e.g., compression equipment, not shown). Alternatively, of course, carbon dioxide by-product can be discarded. The diester product is withdrawn from recovery zone 30 and can be used as such, for example, as a solvent or plasticizer, or can be subjected to further processing such as, for example, hydrolysis to yield ethylene glycol or pyrolysis to yield vinyl acetate. Low and high boiling by-products are also recovered within recovery zone 30 and may be used as such or recycled as desired. Although recovery zone 30 is depicted schematically, it normally comprises a series of distillation columns of conventional type and design, well understood by those skilled in the art.

Obvious modifications to the system shown in the drawing are readily apparent. For example, the purge need not be taken from the point shown and can be readily be taken from a point upstream of compressor 20 as from the place indicated. It is not necessary for the liquid removed from separator 22 via conduit 23 to be returned to the oxidation zone. It can readily, for example, be introduced to recovery zone 30 separately from or conjointly with the portion of the liquid phase reaction medium withdrawn via conduit 24. It is equally possible to operate the oxidation reaction system without cooler 21 or separator 22 in which case the vapor withdrawn from oxidation zone via conduit 18 would merely be compressed and recycled.

EXAMPLES

The following examples are presented to further illustrate this invention but are not intended to limit the scope thereof. Unless otherwise stated, all parts and percents in the description of the examples are on a molar basis. As used in the description of the examples, the following terms have the following meanings:

selectivity means moles of diester product and precursors thereof which are formed per mole of olefinically unsaturated compound reacting, generally expressed as a percentage, rate refers to the gram moles of diester product and precursors thereof formed per hour per liter of liquid phase reaction medium within the oxidation zone.

EXAMPLE 1

To a 1-liter titanium autoclave are charged 450 grams acetic acid, 10.5 grams tellurium oxide, 39 grams of a 48 percent hydrobromic acid solution (in water) and 38.6 grams of 2-bromoethyl acetate. The autoclave is then pressured to 400 psig with nitrogen, and the system is heated to 160°C. Thereafter oxygen at a rate of 25 liter/hour and ethylene at a rate of 250 liter/hour (both gas volumes measured at 0°C. and 760 mmHg) are introduced to the autoclave via a sparger. The reaction is conducted continuously in this manner for 80 minutes after which time the system is depressured and reactor contents cooled. Analysis of the reactor contents by gas chromatographic techniques for ethylene glycol diacetate and its precursors indicate a net make of 1.29 gram-moles. This corresponds to an average rate of production of 0.96 moles/hour/liter.

EXAMPLE 2

Example 1 is repeated with only a change in the rates of materials sparged into the reactor during the conduct of the reaction. In this example, 45 liter/hour of oxygen, 55 liter/hour of ethylene and 175 liter/hour (gas volumes measured at 0°C. and 760 mmHg) of ethane are introduced. After only 55 minutes of operation a net product make of ethylene glycol diacetate and its precursors of 1.35 moles is obtained. This corresponds to an average rate of production of 1.47 moles/hour/liter.

A series of runs similar to those of Examples 1 and 2 above are carried out over a range of ethylene partial pressure of 10 psia to 500 psia, and over this range it is found that reaction rate is not favored by increasing ethylene partial pressure. Results with such olefinically unsaturated compound as propylene, 3-methylbutene-1, and n-pentene-1 also demonstrate that increasing olefin partial pressure does not favorably affect rate.

The foregoing examples illustrate the surprising nature of this invention. Example 1, a control, when contrasted with Example 2, indicates the advantages accruing from the increase in oxygen partial pressure and from the introduction of a third component to the system.

EXAMPLE 3

Continuous oxidation equipment similar to that depicted in the annexed drawing is set up, and a series of runs are conducted therein with a variety of "third components" employing both ethylene and propylene as the olefinically unsaturated compounds.

The reaction vessel is a one-gallon agitated glass-lined autoclave equipped with a titanium condenser maintained at about 35°C. on the coolant side to which vapors generated in the reaction are conducted. Materials condensed are separated from non-condensed gases in a knock-out pot and this condensate is refluxed as shown in the drawing.

Acetic acid is used as the carboxylic acid reactant in each of the following runs and, together with the catalyst system, is supplied at a rate sufficient to maintain constant liquid inventory within the oxidation zone.

The acetic acid/catalyst system streams supplied in each of the runs have the following compositions:

In Runs 1 – 6:
| | |
|---|---|
| acetic acid | 86.7 weight % |
| 2-bromoethyl acetate | 7.3 weight % |
| TeO$_2$ | 2.0 weight % |
| water | 4.0 weight % |

In Runs 7–9:
| | |
|---|---|
| acetic acid | 86.1 weight % |
| 1,2-dibromopropane | 4.4 weight % |
| aqueous hydrobromic acid (48 wt. % solution) | 7.5 weight % |
| TeO$_2$ | 2.0 weight % |

In Run 10:
| | |
|---|---|
| acetic acid | 90.0 weight % |
| Mn(OOC—CH$_3$)$_2$·4H$_2$O | 2.0 weight % |
| HCl | 3.0 weight % |
| Water | 5.0 weight % |

The foregoing acetic acid/catalyst streams are supplied at a rate sufficient to maintain the concentration in the reaction zone overflow of total reaction products, determined as equivalent ethylene or propylene glycol diacetate, at about 10 weight percent in each run.

Stream flows set forth in Table II are expressed in gram-moles per hour and are rounded off to contain no more than four significant figures. The numbers underneath the stream identifications in Table II are the corresponding index numbers of the annexed drawing. The composition of the recycle gas in all runs is expressed on a dry basis and excludes acetic acid, water and materials having boiling points higher than that of acetic acid. In none of the runs will the omission of water, acetic acid and heavier materials from the recycled vapor stream compositions affect the numbers set forth by more than one percent.

TABLE I

Reaction Conditions

| | Oxidation Zone | | | Average Liquid Feed Rate gms/hour |
|---|---|---|---|---|
| Run No. | Olefin | Temp °C | Press, psia | |
| 1 | $C_2=$ | 160 | 415 | 4,780 |
| 2 | $C_2=$ | 160 | 415 | 8,460 |
| 3 | $C_2=$ | 160 | 415 | 6,120 |
| 4 | $C_2=$ | 160 | 415 | 6,420 |
| 5 | $C_2=$ | 160 | 415 | 9,530 |
| 6 | $C_2=$ | 160 | 415 | 6,680 |
| 7 | $C_3=$ | 150 | 315 | 4,030 |
| 8 | $C_3=$ | 150 | 315 | 4,210 |
| 9 | $C_3=$ | 150 | 315 | 8,460 |
| 10 | $C_2+$ | 160 | 415 | 2,250 |

TABLE II.—STREAM FLOWS
(Moles per Hour)

| Run No. | Component | Olefin feed (12) | Oxygen feed (13) | "Third component" (15) | Total reactor feed (12+13+14+15) | Effluent vapor (25) | Recycle vapor (14) | Purge (19) |
|---|---|---|---|---|---|---|---|---|
| 1 | $C_2H_4$ | 3.669 | | | 15.00 | 11.35 | 11.33 | .019 |
| | $O_2$ | | 2.060 | | 8.20 | 6.15 | 6.14 | .010 |
| | $C_2H_6$ | .007 | | | 4.40 | 4.40 | 4.39 | .007 |
| | A | | .065 | | 39.00 | 39.00 | 38.94 | .065 |
| | $N_2$ | | .044 | | 26.00 | 26.00 | 25.96 | .044 |
| | $CO_2$ | | | | 7.40 | 7.41 | 7.40 | .012 |
| | Total | 3.676 | 2.169 | | 100.00 | 94.31 | 94.16 | .158 |
| 2 | $C_2H_4$ | 6.270 | | | 15.00 | 8.82 | 8.73 | .087 |
| | $O_2$ | | 3.578 | | 13.90 | 10.43 | 10.32 | .103 |
| | $C_2H_6$ | .013 | | .482 | 50.00 | 50.00 | 49.51 | .494 |
| | A | | .113 | | 11.40 | 11.40 | 11.29 | .113 |
| | $N_2$ | | .075 | | 7.60 | 7.60 | 7.52 | .075 |
| | $CO_2$ | | | | 2.10 | 2.12 | 2.10 | .021 |
| | Total | 6.283 | 3.766 | .482 | 100.00 | 90.36 | 89.47 | .894 |
| 3 | $C_2H_4$ | 4.786 | | | 15.00 | 11.33 | 11.21 | .115 |
| | $O_2$ | | 2.705 | | 10.50 | 7.88 | 7.80 | .080 |
| | $C_2H_6$ | .010 | | | .96 | .96 | .95 | .010 |
| | A | | .085 | | 8.42 | 8.42 | 8.33 | .085 |
| | $N_2$ | | .057 | | 5.62 | 5.62 | 5.56 | .057 |
| | $CO_2$ | | | .592 | 60.00 | 60.02 | 59.41 | .607 |
| | Total | 4.795 | 2.847 | .592 | 100.00 | 94.22 | 93.27 | .954 |
| 4 | $C_2H_4$ | 4.805 | | | 15.00 | 10.20 | 10.19 | .005 |
| | $O_2$ | | 2.704 | | 10.80 | 8.10 | 8.10 | .004 |
| | $C_2H_6$ | .010 | | | 18.00 | 18.00 | 17.99 | .010 |
| | A | | .013 | | 24.20 | 24.20 | 24.19 | .013 |
| | $N_2$ | | .001 | | 1.30 | 1.30 | 1.30 | .001 |
| | $CO_2$ | | | | 30.70 | 30.72 | 30.70 | .016 |
| | Total | 4.815 | 2.718 | | 100.00 | 92.52 | 92.47 | .049 |
| 5 | $C_2H_4$ | 6.931 | | | 15.00 | 8.11 | 8.07 | .036 |
| | $O_2$ | | 3.297 | | 15.50 | 11.63 | 11.57 | .052 |
| | $C_2H_6$ | .014 | | .255 | 60.00 | 60.00 | 59.73 | .269 |
| | A | | .018 | | 4.10 | 4.10 | 4.08 | .018 |
| | $N_2$ | | .001 | | .20 | .20 | .20 | .001 |
| | $CO_2$ | | | | 5.20 | 5.22 | 5.20 | .023 |
| | Total | 6,945 | 3,946 | .255 | 100.00 | 89.25 | 88.85 | .400 |
| 6 | $C_2H_4$ | 5.010 | | | 15.00 | 10.02 | 9.99 | .030 |
| | $O_2$ | | 2.825 | | 11.20 | 8.40 | 8.38 | .025 |
| | $CH_4$ | | | .177 | 60.00 | 60.00 | 59.82 | .177 |
| | $C_2H_6$ | .010 | | | 3.40 | 3.40 | 3.39 | .010 |
| | A | | .013 | | 4.50 | 4.50 | 4.49 | .013 |
| | $N_2$ | | .001 | | .20 | .20 | .20 | .001 |
| | $CO_2$ | | | | 5.70 | 5.72 | 5.70 | .017 |
| | Total | 5.020 | 2.839 | .177 | 100.00 | 92.24 | 91.96 | .273 |
| 7 | $C_3H_6$ | 2.899 | | | 6.00 | 3.10 | 3.10 | .001 |
| | $O_2$ | | 1.622 | | 6.48 | 4.86 | 4.86 | .002 |
| | $C_3H_8$ | .003 | | | 6.42 | 6.42 | 6.42 | .003 |
| | A | | .008 | | 17.16 | 17.16 | 17.15 | .008 |
| | $N_2$ | | .0004 | | .90 | .90 | .90 | .0004 |
| | $CO_2$ | | | | 23.04 | 23.05 | 23.04 | .010 |
| | Total | 2.902 | 1.630 | | 60.00 | 55.49 | 55.47 | .025 |
| 8 | $C_3H_6$ | 3.038 | | | 6.00 | 2.97 | 2.96 | .006 |
| | $O_2$ | | 1.705 | | 6.78 | 5.09 | 5.08 | .010 |
| | $CH_4$ | | | .072 | 36.00 | 36.00 | 35.93 | .072 |
| | $C_3H_8$ | .003 | | | 1.50 | 1.50 | 1.50 | .003 |
| | A | | .008 | | 4.08 | 4.08 | 4.07 | .008 |
| | $N_2$ | | .0005 | | .24 | .24 | .24 | .0005 |
| | $CO_2$ | | | | 5.40 | 5.40 | 5.40 | .001 |
| | Total | 3.041 | 1.714 | .072 | 60.00 | 55.28 | 55.17 | .111 |

TABLE II.—Continued
(Moles per Hour)

| Run No. | Component | Olefin feed (12) | Oxygen feed (13) | "Third component" (15) | Total reactor feed (12+13+14+15) | Effluent vapor (25) | Recycle vapor (14) | Purge (19) |
|---|---|---|---|---|---|---|---|---|
| 9 | $C_3H_6$ | 5.680 | | | 9.00 | 3.37 | 3.32 | .046 |
|   | $O_2$ | | 3.279 | | 12.60 | 9.45 | 9.32 | .129 |
|   | $C_3H_8$ | .489 | | | 35.79 | 35.79 | 35.30 | .489 |
|   | A | | .015 | | 1.09 | 1.09 | 1.08 | .015 |
|   | $N_2$ | | .0008 | | .06 | .06 | .06 | .0008 |
|   | $CO_2$ | | | | 1.46 | 1.48 | 1.46 | .023 |
| Total | | 6.169 | 3.295 | | 60.00 | 51.24 | 50.54 | .703 |
| 10 | $C_2H_4$ | 1.664 | | | 3.60 | 1.95 | 1.94 | .0087 |
|   | $O_2$ | | .9425 | | 3.72 | 2.79 | 2.78 | .0125 |
|   | $C_2H_6$ | .0033 | | .0612 | 14.40 | 14.40 | 14.34 | .0645 |
|   | A | | .0044 | | .98 | .98 | .98 | .0044 |
|   | $N_2$ | | .0002 | | .05 | .05 | .05 | .0002 |
|   | $CO_2$ | | | | 1.25 | 1.25 | 1.25 | .0056 |
| Total | | 1.667 | .9471 | .0612 | 24.00 | 21.42 | 21.32 | .0960 |

Runs 1, 4 and 7 of the foregoing tables are controls, not illustrative of the invention. The remaining runs are illustrative of the invention. Run 1 employs 99.8 percent pure ethylene and commercial 95 percent purity oxygen. The recycle vapor, accordingly, predominates in undesirable materials attributable to the impurities in the feedstock. Run 2, in contrast, employs the same feeds as run 1 but, in addition, a small amount of ethane is introduced from an extraneous source. In run 3, carbon dioxide is introduced to the recycle vapor.

Run 4, also a control, employs the same ethylene feedstock but, in this instance, a 99.5 percent oxygen feedstream is employed and, even though the ethane content of the recycle vapor is substantially higher than in the previous runs, results are inferior to runs in accordance with this invention. Run 5 is identical with run 4 but employs separately introduced ethane as the third component while run 6 employs methane.

Runs 7 and 9 inclusive illustrate operations with propylene, run 7 being a control. In runs 7 and 8, 99.9 percent propylene and 99.5 percent oxygen are used; however, in run 8, methane, introduced from an extraneous source is employed as a portion of the third component. Run 9 illustrates an embodiment of the invention wherein an impure feed is employed with advantage, the propylene feed in this example having a purity of only 92 percent with the dominant impurity being propane.

In each of Runs 1–6 and 10, the same selectivities (96 percent) are attained while, in each of runs 7–9, the selectivities are 93 percent. Reaction rates are given in Table III.

TABLE III

| Run No. | Rate, moles/liter/hr. |
|---|---|
| 1 | 3.38 |
| 2 | 5.98 |
| 3 | 4.33 |
| 4 | 4.54 |
| 5 | 6.74 |
| 6 | 4.72 |
| 7 | 1.99 |
| 8 | 2.08 |
| 9 | 4.18 |
| 10 | 0.53 |

Although the rate obtained in run 10 is substantially lower than in other runs, this is attributable to the different catalyst because, when run 4 is repeated with the catalyst system of run 10, the rate is only 0.36 gram-moles/liter/hr.

Run 5 of Example 3 is repeated with cis-butene-2, allyl alcohol, 3-methylbutene-1 and 2-chlorobutene-2 instead of ethylene with substantially similar results obtained.

Run 5 of Example 3 is repeated at temperatures of 150, 170, 180 and 200 and pressures of 415, 315, 415 and 250 respectively. Although stream flows change, results are substantially similar to those of the corresponding run of Example 3.

Runs 4, 5, 7 and 9 of Example 3 are repeated with butyric acid, propionic acid, acetoacetic acid and benzoic acid. Results are similar to those of Example 3, i.e., the rates of formation of the corresponding esters in runs analogous to runs 5 and 9 are substantially higher than in the runs analogous to runs 4 and 7.

We claim:

1. In a process for the production of monobasic carboxylic acid diesters of $C_2-C_5$ vicinal glycols by the oxidation with molecular oxygen of a $C_2-C_5$ olefinically unsaturated compound in the presence of a monobasic carboxylic acid and a variable valence metal cation selected from at least one member of the group consisting of tellurium, antimony, vanadium, gallium, arsenic, selenium and silver and at least one of bromine, chlorine, a bromine-containing compound yielding bromide ions during reaction or a chlorine-containing compound yielding chloride ions during reaction, said oxidation being conducted within an oxidation zone in the presence of a liquid phase reaction medium comprising the carboxylic acid, wherein oxygen and the olefinically unsaturated compound are introduced to the oxidation zone and are contacted with the liquid phase reaction medium therewithin and wherein a vapor stream comprising unreacted oxygen and unreacted olefinically unsaturated compound is withdrawn from the oxidation zone and recycled at least in part to the oxidation zone, the improvement which comprises: maintaining at least 55 mole percent of a third component in the vapor stream recycled to the oxidation zone, said third component being selected from at least one member of the group consisting of ethane, propane, and carbon dioxide and concurrently maintaining the oxygen partial pressure in the vapor stream recycled to the oxidation zone at a level of at least 5 p.s.i.a. and not greater than $R$ where:

$$R = P \frac{0.18y_1 + 0.09y_2 + 0.135y_3 + 0.117y_4 + 0.36y_5}{y_1 + y_2 + y_3 + y_4 + y_5}$$

where $R$ is the oxygen partial pressure in psia $P$ is the total pressure of the recycled vapor stream $y_1$ is the mole fraction of ethane in the recycled vapor stream $y_2$ is the mole fraction of nitrogen in the recycled vapor stream $y_3$ is the mole fraction of carbon dioxide in the recycled vapor stream $y_4$ is the mole fraction of methane in the recycled vapor stream $y_5$ is the mole fraction of propane in the recycled vapor stream 2. A process in accordance with claim 1 wherein the concentration of olefinically unsaturated compound in the vapor stream recycled to the oxidation zone is maintained at a level of at least 1.0 mole percent.

3. A process in accordance with claim 1 wherein the olefinically unsaturated compound is ethylene.

4. A process in accordance with claim 3 wherein reaction pressure is between about 200 p.s.i.a. and about 600 p.s.i.a.

5. A process in accordance with claim 3 wherein the oxygen partial pressure is at least 15 p.s.i.a.

6. A process in accordance with claim 1 wherein the olefinically unsaturated compound is propylene.

7. A process in accordance with claim 4 wherein the reaction pressure is between about 200 p.s.i.a. and 600 p.s.i.a.

8. A process in accordance with claim 1 wherein the oxygen partial pressure does not exceed 0.95 R.

9. A process in accordance with claim 1 wherein the third component is a mixture of ethane and carbon dioxide.

10. A process in accordance with claim 1 wherein the third component is a mixture of propane and carbon dioxide.

11. A process in accordance with claim 1 wherein the oxygen partial pressure is at least 10 p.s.i.a.

12. A process in accordance with claim 1 wherein the carboxylic acid is acetic acid and the olefin is ethylene.

13. A process in accordance with claim 1 wherein the carboxylic acid is acetic acid and the olefin is propylene.

14. A process in accordance with claim 1 wherein the cation is tellurium and the halogen is selected from the group consisting of bromine and bromine-containing compounds.

15. A process in accordance with claim 14 wherein the oxygen partial pressure is at least 10 p.s.i.a.

17. A process in accordance with claim 14 wherein the olefin is ethylene.

16. A process in accordance with claim 14 wherein the oxygen partial pressure does not exceed 0.95R.

18. A process in accordance with claim 17 wherein the carboxylic acid is acetic acid.

19. A process in accordance with claim 14 wherein the olefin is propylene.

20. A process in accordance with claim 19 wherein the carboxylic acid is acetic acid.

* * * * *